US006993510B2

(12) United States Patent
Guy et al.

(10) Patent No.: US 6,993,510 B2
(45) Date of Patent: Jan. 31, 2006

(54) SYSTEM AND METHOD FOR MANAGING ACCOUNTS

(75) Inventors: Robert C. Guy, Omaha, NE (US);
Diane Lyn Snider, Omaha, NE (US);
Douglas A. Goering, Martell, NE (US);
Darren D. Beck, Gretna, NE (US);
Tony D. Hames, Bennington, NE (US);
George D. Bright, Omaha, NE (US);
William F. Harrington, Omaha, NE (US); David G. Rivera, Omaha, NE (US)

(73) Assignee: First Data Corporation, Englewood, CO (US)

(*) Notice: Subject to any disclaimer, the term of this patent is extended or adjusted under 35 U.S.C. 154(b) by 411 days.

(21) Appl. No.: 10/091,653

(22) Filed: Mar. 5, 2002

(65) Prior Publication Data
US 2003/0172039 A1    Sep. 11, 2003

(51) Int. Cl.
*G06F 17/00* (2006.01)
(52) U.S. Cl. .......................... 705/68; 705/72; 707/100; 707/10
(58) Field of Classification Search ................ 705/68, 705/69, 70, 71, 72, 75; 707/100, 104, 10
See application file for complete search history.

(56) References Cited

U.S. PATENT DOCUMENTS

| 4,256,955 A | 3/1981 | Giraud et al. |
| 4,321,672 A | 3/1982 | Braun et al. |
| 4,700,055 A | 10/1987 | Kashkashian, Jr. |
| 4,837,422 A | 6/1989 | Dethloff et al. |
| 4,900,903 A | 2/1990 | Wright et al. |
| 5,155,342 A | 10/1992 | Urano |
| 5,231,569 A | 7/1993 | Myatt et al. |
| 5,483,445 A * | 1/1996 | Pickering ................ 705/40 |

(Continued)

FOREIGN PATENT DOCUMENTS

EP    0540234 A2    5/1993

(Continued)

OTHER PUBLICATIONS

IBM Technical Disclosure Bulletin; Title Transaction completion code based on digital signature; vol. 28; TDB-ACC-NO: NN85081109; Aug. 1, 1985.*

*Primary Examiner*—Pierre Eddy Elisca
(74) *Attorney, Agent, or Firm*—Townsend and Townsend and Crew LLP

(57) ABSTRACT

A system for managing credit card accounts or the like, having a database for storing a permanent customer ID associated with each cardholder, an account ID for each account accessible by the cardholder, a presentation ID (card number) appearing on each card, and a role identifier. When a transaction is conducted at a terminal, the presentation ID is provided to a database management system, which then can retrieve the customer ID and the account ID (for the account being accessed). If a card is lost, stolen or otherwise rendered unusable, a security suspense record is inserted into the database in an account ID filed associated with the affected presentation ID. When the presentation ID associated with the lost or stolen card is provided to the system, the security suspense record is retrieved and causes the transaction to be invalidated. All other presentation IDs (and associated cards) for the affected account can continue to be used, thus eliminating the need to close the account. The role identifier permits account criteria (e.g., financial responsibility, credit limits, purchase restrictions, etc.) to be established for individual cardholders.

23 Claims, 4 Drawing Sheets

U.S. PATENT DOCUMENTS

| | | |
|---|---|---|
| 5,500,513 A | 3/1996 | Langhans et al. |
| 5,513,102 A | 4/1996 | Auriemma |
| 5,537,314 A | 7/1996 | Kanter |
| 5,613,012 A | 3/1997 | Hoffman et al. |
| 5,614,703 A | 3/1997 | Martin et al. |
| 5,621,640 A | 4/1997 | Burke |
| 5,649,117 A | 7/1997 | Landry |
| 5,684,965 A * | 11/1997 | Pickering ............... 705/34 |
| 5,770,843 A | 6/1998 | Rose et al. |
| 5,826,243 A | 10/1998 | Musmanno et al. |
| 5,859,419 A | 1/1999 | Wynn |
| 5,864,830 A | 1/1999 | Armetta et al. |
| 5,914,472 A | 6/1999 | Foladare et al. |
| 5,920,847 A | 7/1999 | Kolling et al. |
| 5,953,710 A | 9/1999 | Fleming |
| 5,970,480 A | 10/1999 | Kalina |
| 5,978,780 A | 11/1999 | Watson |
| 5,999,596 A | 12/1999 | Walker et al. |
| 6,021,943 A | 2/2000 | Chastain |
| 6,044,360 A | 3/2000 | Picciallo |
| 6,049,782 A | 4/2000 | Gottesman et al. |
| 6,108,641 A | 8/2000 | Kenna et al. |
| 6,128,599 A | 10/2000 | Walker et al. |
| 6,128,602 A | 10/2000 | Northington et al. |
| 6,128,603 A | 10/2000 | Dent et al. |
| 6,226,623 B1 | 5/2001 | Schein et al. |
| 6,304,860 B1 | 10/2001 | Martin, Jr. et al. |

FOREIGN PATENT DOCUMENTS

| | | | |
|---|---|---|---|
| EP | 0725376 A2 | | 8/1996 |
| JP | 405314136 A | * | 11/1993 |
| WO | 97/43893 | | 11/1997 |

* cited by examiner

| Customer ID | Name | SSN | Telephone | DOB | Acct1 ID | Role (P,S,O) | PI ID1 | Acct2 ID | Role (P,S,O) | PI ID2 |
|---|---|---|---|---|---|---|---|---|---|---|
| 12345678901 | Smith, Sam | 404 44 4020 | 402 555 9999 | 042143 | 5417112861 | P | 44171286 | 5417112862 | S | 44171285 |
| 12345678902 | Smith, Sue | 404 44 4021 | 402 555 9999 | 012050 | 5417112862 | P | 44171287 | | | |
| 12345678903 | Smith, John | 404 44 4022 | 402 555 9999 | 042081 | 5417112862 | O | 44171290 | | | |
| 12345678904 | Smith, Amy | 404 44 4023 | 402 555 9999 | 022386 | 5417999999 | O | 44171291 | 5417112862 | O | 44171292 |

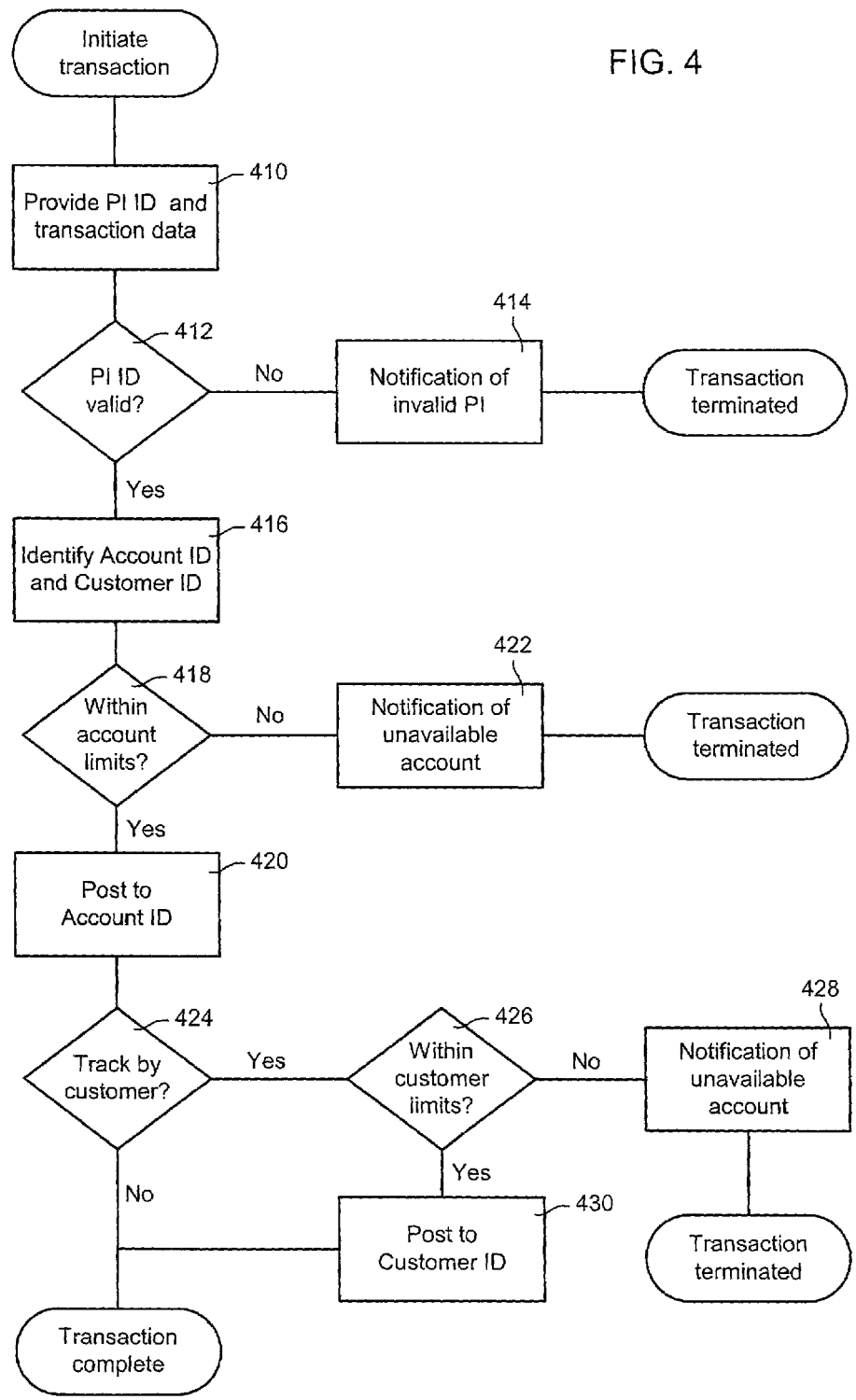

SYSTEM AND METHOD FOR MANAGING ACCOUNTS

BACKGROUND OF THE INVENTION

The present invention relates to managing accounts at banks, retail establishments and other commercial and non-commercial institutions, and more particularly to a system and method for managing transactions in connection with such accounts.

Systems for managing credit card and other financial accounts are in widespread use. These systems have become sophisticated and complex, particularly as consumers become more comfortable with on-line transactions and increase their use of credit cards. Customers now use credit cards, debit cards and similar devices to make purchases, obtain cash advances, check account balances and move cash between accounts. Transactions are conducted at point-of-sale terminals in retail stores, at automated teller machines, and over the Internet using personal computers. Many consumers have established multiple accounts, and in some cases family members each have credit cards and together may be using one or more of those accounts.

One result of the proliferation of credit cards has been the cost, burden and inconvenience of dealing with lost or stolen cards. If several family members are using one account, and one loses his or her card, the account is usually closed (to prevent unauthorized use) and a new account opened with a new card for each family member. The institution issuing the new card has to change its systems to accommodate the new account, and often the cardholders must wait several weeks or more before being able to use the new account.

Also, banks and other institutions want to target customers for special financial services (or other marketing programs) depending, for example, on the extent of use of a credit card. A customer that makes frequent use of credit cards may be a candidate for other financial services offered by the bank. As another example, a customer that uses a credit card to purchase certain types of products may be a good prospect for marketing related products. As a result, banks and other institutions will track patterns of credit card, debit card and ATM card use by cardholders. This becomes difficult, however, if there are several different cardholders using the same account.

BRIEF SUMMARY OF THE INVENTION

There is provided, in accordance with the present invention, a system and method for managing accounts, such as credit card accounts, wherein more than one customer may be associated with each account, and wherein each customer has a role relating to such account. The customer may conduct a transaction for an account by using a presentation instrument (e.g., credit card) issued to that customer. The system includes a database for storing a customer ID associated with each customer, an account ID associated with each account, and a presentation ID associated with each presentation instrument, with the database structured for relating each presentation ID to a specific customer and to an account used by that specific customer. The system further includes a database management system for managing the data stored in the database.

When a transaction is conducted, transaction data (i.e., data defining the nature of the transaction, such as the amount and location of the transaction) is posted to an account in response to receiving a presentation ID with such transaction data. The presentation ID is used by the data management system to access the account and thereby reflect that the transaction has been conducted by the specific customer for that account.

In one embodiment of the invention, the presentation instruments are credit cards and the accounts are credit card accounts. Multiple cards for the same account may be issued to different cardholders, and the cardholders may have different roles. One cardholder may have the primary cardholder role and thus have primary financial responsibility for the account. Other cardholders have secondary or other roles. The database stores data indicating the role of each cardholder, and transactions can be tracked for the account as a whole (using the account ID) and also tracked separately for each cardholder (using the customer ID assigned to that cardholder).

In another embodiment of the invention, if a card is lost or stolen and thereby deemed not useable, a security suspense record is stored in the database at the account ID associated with the lost or stolen credit card. If a transaction is attempted using that presentation ID, the security suspense record is retrieved (rather than a valid account ID) and the system invalidates the transaction.

A more complete understanding of the present invention may be derived by referring to the detailed description of the invention and to the claims, when considered in connection with the Figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates a table in the database of FIG. 1.

FIG. 4 is a flow diagram illustrating the operation of the database management system in FIG. 1, when a cardholder conducts a transaction.

DETAILED DESCRIPTION OF THE INVENTION

Figure 1:
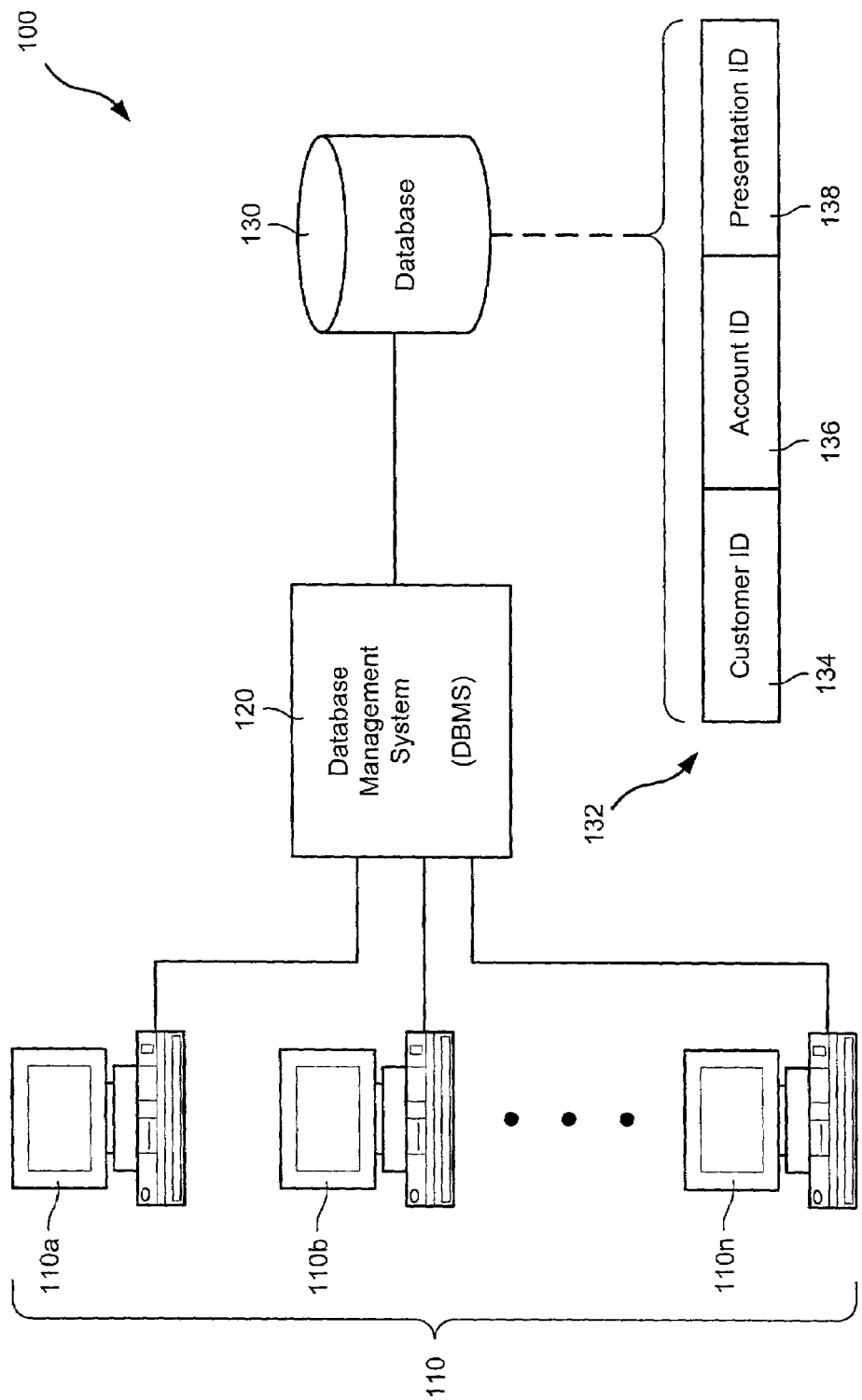
FIG. 1 is a general block diagram showing a system for managing accounts in accordance with one embodiment of the present invention.

Referring now to FIG. 1, an account management network 100 in accordance with one embodiment of the present invention is illustrated. The network 100 manages credit card accounts and has a plurality of terminals 110 (110a through 110n), a central database management system (DBMS) 120 and a database 130. The terminals 110 are used to access data in the database 130 via the DBMS 120. The terminals 110 may be point-of-sale terminals at remote retail establishments, where credit card information is read or entered, along with retail transaction data (e.g., the amount of a purchase, as well as the name of the retail establishment, date, product and other useful information). Such data can be conventionally collected, either by electronically reading data from magnetic strips on credit cards and from product UPC (uniform product code) labels, or by being manually entered by a clerk at a terminal keyboard.

The terminals 110 may also include internal workstations at a bank or other central location where the credit card accounts are managed. Those workstations would be used by employees to enter, collect, retrieve or display data in connection with setting up credit card accounts, answering customer telephone inquiries, and performing other normal financial or business functions required for operating the credit card management network 100.

The DBMS 120 can be a relational database management system that permits data in the database 130 to be created, maintained, manipulated and retrieved. The database 130 is likewise relational and, as conventional, stores data in tables, with the DBMS 120 using, for example, a structured query language (SQL) in order to maintain and operate the database. While the DBMS 120 and database 130 are relational in the described embodiment, those skilled in the art will appreciate that there are many types of databases (e.g., sequential flat files, hierarchical, object oriented, etc.) that can be used within the scope of the present invention.

The network 100 as thus far described can be implemented using known architectures and systems. In addition, a network that has the underlying architecture and systems for implementing the present invention can be found in co-pending provisional U.S. patent application Ser. No. 60/362,222, for METHOD AND SYSTEM FOR PROCESSING CREDIT CARD RELATED TRANSACTIONS filed on Mar. 4, 2002, by Peter M. Zelechoski, Rex Johnson, Richard McKie, Tom Lima, Steve Joyce, Kent Parkinson, Norman T. Davis, Tom Emery, Douglas E. Johnson and Nabil Abu El Ata, and owned in common with the present application, such co-pending application being hereby incorporated by reference.

In the database 130, there is illustrated (FIG. 1) in simplified form the general content of one database table 132 used for purposes of accessing credit card accounts. The database table 132 has three fields (columns) illustrated, namely, a customer ID field 134, an account ID field 136, and a presentation (presentation instrument or credit card) ID field 138. Thus, for each customer (implemented as a row in the table 132), the database maintains a unique and permanent customer ID, the account ID (credit card account number) for each account of that customer, and the presentation ID (card number) for the card that the customer uses to access the account. Although not shown in FIG. 1, the customer may have more than one account (and hence have more than one account ID and more than one presentation ID) associated with the customer ID.

For reasons which will become apparent later, the customer ID is "permanent", i.e., it is not normally changed (at least during the time that the customer continues to have a relationship with the card-issuing organization), even if the customer opens a new account, or has credit cards lost or stolen. However, each account ID and presentation ID may change, and new account IDs and presentation IDs may be added to the table, depending on the needs or circumstances of the customer. Because of the permanent customer ID, personal information pertaining to that customer that is stored in the database 130 (e.g., addresses, phone numbers, birth date, social security number, etc.) can be associated with the customer ID (and thus maintained for that customer) even as account IDs and presentation IDs change.

The general operation of the network 100 will now be briefly described. If a cardholder is at a retail establishment making a purchase, a credit card is presented to a clerk and the credit card number (presentation ID) and transaction data for the purchase are entered at one of the terminals 110 and transmitted to the DBMS 120. In order to make sure the transaction data is posted to the appropriate account, the presentation ID is used to retrieve the account ID associated with that presentation ID. Once the account ID is identified, the transaction data is stored in the database along with any previously stored transaction data pertaining to that account. The account (and collected transaction data) can be periodically accessed for normal business purposes, for example, to print monthly statements, to determine if credit limits have been exceeded, to check for account activity as part of a separate marketing program, as well as many other activities of the bank or card issuer.

As mentioned earlier, in one embodiment the presentation ID will be unique to the cardholder. That is, if there are multiple cardholders for one account, each cardholder will have a different presentation ID even though transactions are all posted against the same account. This permits the card issuer to separately track (if desired) transaction data for each cardholder, for example, when the primary cardholder has established separate credit limits for each of the other cardholders. This feature is implemented by assigning a "role" to each cardholder. The roles may be relatively simple, such as "primary" and "secondary". The primary cardholder would have primary financial responsibility for the account (monthly statements would be addressed to the primary cardholder), and might have the exclusive authority to request changes (such as to mailing addresses and to credit limits), close the account, establish additional cardholders, etc. The secondary cardholder would be able to access the account and charge purchases, but not be able to make any changes to the account. Further, there optionally may be other roles as well, such as might exist for an account where children have been issued cards. In such a situation, the "other" role might have significantly lower credit limits (as perhaps established by the card issuer), have restrictions on the types of products that could be purchased with the card, and have other restrictions appropriate for a more limited use of the account. The customer ID and the presentation ID stored in the database 130 permit the roles for cardholders to be defined not only for each account, but also for all accounts for which a card has been issued to one customer.

Figure 2:
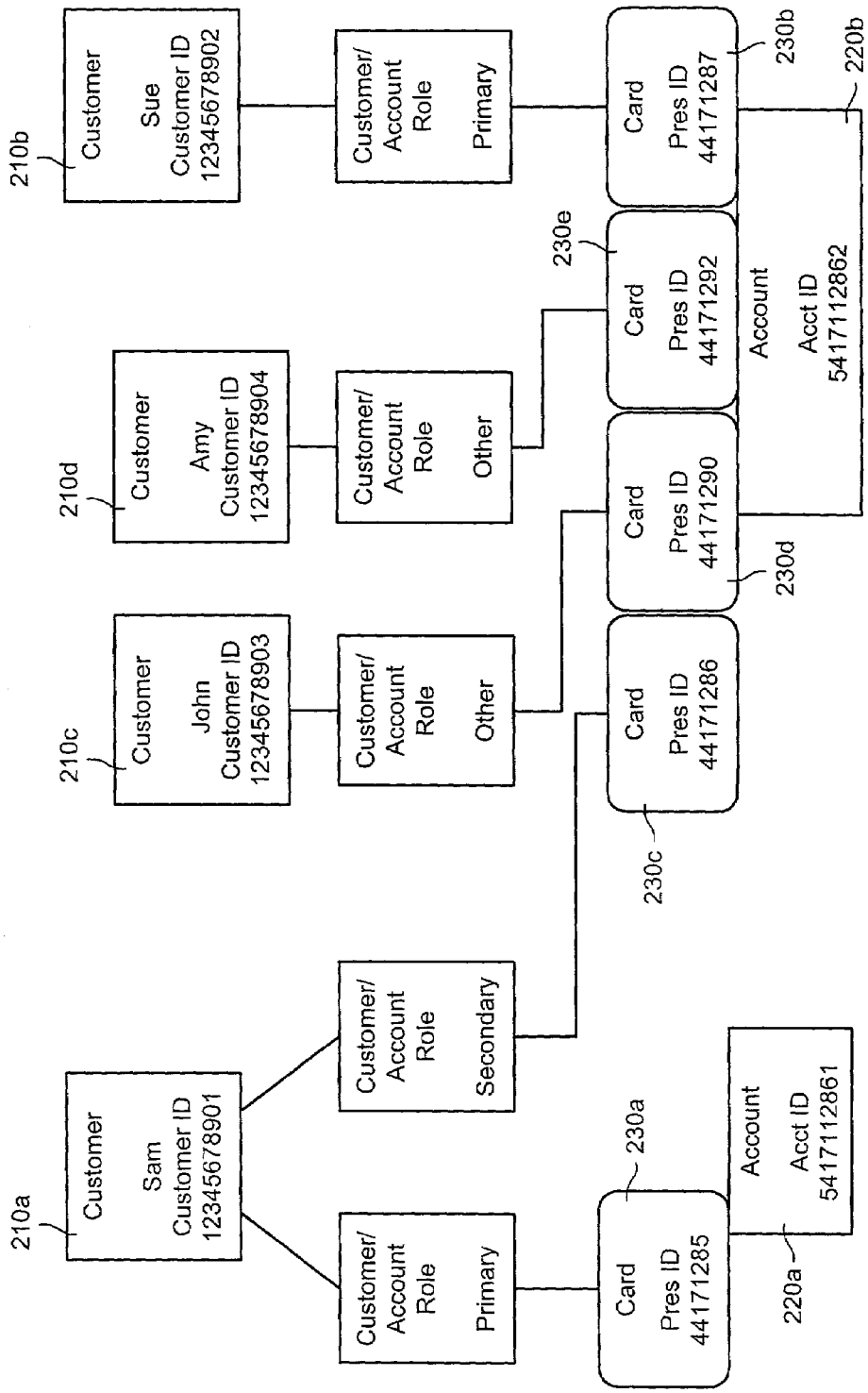
FIG. 2 is a diagram illustrating an embodiment of the present invention where there are two credit card accounts and where multiple cardholders are using one of those accounts.

The relationships and use of customer IDs, account IDs, presentation IDs and roles that multiple cardholders or customers may have in connection with an account, is better understood by referring to FIG. 2.

In FIG. 2 there are illustrated four customers 210a, 210b, 210c and 210d. Each customer has an assigned customer ID in the database 130. There are also illustrated two accounts 220a and 220b, each with an assigned account ID. In the arrangement of FIG. 2, customer 210a ("Sam") and customer 210b ("Sue") each have a primary role in connection with one of the accounts. In particular, Sam has the primary role for account 220a and Sue has the primary role for account 220b. In addition, Sam has a secondary role for the account 210b. However, Sam is the only cardholder for account 210a, and thus there are no other roles for that account.

In the example in FIG. 2, the two other customers 210c and 210d ("John" and "Amy", respectively) are children of Sam and Sue, they are only cardholders for account 220b, and thus their roles are "other" and can be much more restricted. As mentioned earlier, this role could be restricted (depending on parameters established either by the card issuer or by the primary cardholder) as to credit limits, types of purchases, and in other ways appropriate for children.

There are five credit cards (presentation instruments) 230a, 230b, 230c, 230d, and 230e associated with the accounts in FIG. 2, with each card having a unique presentation ID (card number) appearing on the card. Since John is the only cardholder for account 220a, there is only one card 230a for that account. That card is issued to John as the primary (and only) cardholder. As to account 220b, there are four cards issued—card 230b to Sue as the primary cardholder, card 230c to John as the secondary cardholder, card 230d to John, and card 230e to Amy.

As evident from FIG. 2, when any one of the cards 230 is presented for conducting a transaction, and the presentation ID associated with that card is provided to the DBMS 120 in FIG. 1, the identity of the account, the identity of the customer, and the role of that customer on the account, can all be determined by accessing the database 130.

This may be better understood by referring to FIG. 3, where a table 310 in the database 130 is illustrated. This particular table arranges the fields (columns) so that for each customer ID there is associated (or related) personal data for that customer, such as name of the cardholder (Name), social security number (SSN), telephone number (TEL), date of birth (DOB), account IDs (Acct1 ID, Acct2 ID), the Role the customer has for each account (P-primary, S-secondary or O-other), and the presentation ID (PI ID1, PI ID2) that has been assigned to each card used by that customer. As can be seen, Sam has two presentation IDs (since he is a cardholder for two different accounts), and Sue and John each have one presentation ID. For reasons to be described shortly, Amy has two presentation IDs, but only one is valid for conducting transactions on the one account for which she is a cardholder.

It should be apparent that database table 310 is only one of many tables that might reside in the database 130. This particular database is used to retrieve account ID, customer ID, role information, and other personal data pertaining to any presentation ID, as may be needed to determine parameters or restrictions that may apply to the cardholder in accessing the account, or to enable the DBMS 120 to post transactions to the account. Other tables that might reside in the database could include, for example, tables for storing transactions associated with each account ID or each customer ID, for storing credit limits for each cardholder and account, for storing mailing addresses, and so forth. The numbers and nature of those tables will depend on the needs of the card issuer and its customer.

In the table of FIG. 3, once a customer (and the account) has been identified and retrieved, the DBMS 120 may be used to post transaction data to the account, as well as to the specific cardholder using that account.

This last mentioned feature would be useful when the card issuer wants to track transaction activity by customer, if there are multiple customers (cardholders) using a single account. For example, a bank (such as the card issuer) may want to know when non-primary cardholders (e.g., John or Amy) are using their cards with such frequency that perhaps they should be contacted with a view of having their own separate accounts. As another example, individual transactions by a customer can be tracked to identify purchases of particular types of products from particular kinds of retail establishments. If Sue's purchases are tracked and she is found to frequently purchase luxury products (even though others on the same account are not buying those kinds of products), she can be targeted for special services offered by the bank for customers having higher cash needs, or even targeted for specialty luxury products offered by an affiliated retail establishment. These, of course, are only a few of many possible purposes for tracking the transactions of individual cardholders on a multi-cardholder account.

As mentioned earlier in connection with FIG. 3, the customer identified as "Amy" is shown to have two presentation IDs, even though she has access to only one account. The account for which she has access is shown under the field "Account2 ID", and when she presents her card having the associated presentation ID (seen under the field PI ID2), she is given authorization to conduct transactions against that account. However, in this example, Amy has previously lost her card for that account. In order to prevent unauthorized access to that same account, a security suspense record is stored in the database 310.

The suspense security record is a string of recognizable characters (in this case the characters "999999"). When a specific customer's card is lost, stolen or otherwise determined to be unusable, the security suspense record is inserted into the account ID field of that account for that customer. In this case, the record is inserted as the last six digits of the account ID under the field Account1 ID. The presentation ID for that card (appearing in the field PI ID1) becomes invalid and a new card for the same account is issued, with the account number now appearing in the field Account2 ID, and with the presentation ID (card number) for the new card appearing in the field PI ID2.

If the unusable card should be presented for conducting a transaction, the presentation ID for that card is provided to the data base and the returned account ID includes the suspense record "999999". The DBMS can be programmed to instruct the terminal providing the invalid card number that the attempted transaction is invalid. Of course, depending on the circumstances and the parameters of the card issuer and the retail establishment involved, other messages can be transmitted to the terminal involved in the transaction (such as "contact a manager" or "contact security personnel" at the retail establishment).

It should be noted that even though a card has been rendered unusable in the case of Amy, the other cardholders are not affected. The account remains open, and the presentation IDs associated with that account for the other cardholders may continue to be used. The impact is limited to the particular card (and presentation ID) of only one customer, and that customer only needs to have a new card (with a new presentation ID) issued.

While in the embodiment of FIG. 3 the account ID is different than each presentation ID, they could in fact be the same for one or more of the cards (for example, when a customer prefers to have an account ID and a presentation ID that are the same). However, if there is more than one cardholder for that account, and if any one of the cards is rendered unusable (e.g., lost or stolen), then a different presentation ID (and card) has to be substituted for all the cards in order to prevent unauthorized use of the account. Of course, this may be of little concern if there is only one cardholder for the account. Further, as long as a new presentation ID is issued to each cardholder, the original account ID can continue to be used within the system for identifying the account (i.e., the account does not need to be closed as long as the presentation ID or IDs that were the same as the account ID are changed to a different number).

Also, while the table 310 in FIG. 3 is shown as having fields for only two accounts (two account IDs and two presentation IDs) relating to each customer ID, there could be any number of such accounts, depending on the needs of the card issuer and its customers.

FIG. 4 is a flow diagram illustrating one embodiment of a process that may be used for implementing various aspects of the invention described earlier in connection with FIGS. 1, 2 and 3.

In FIG. 4, when a transaction is initiated, one of the terminals 110 provides a presentation (presentation instrument or credit card) ID (PI ID) and transaction data to the DBMS 120 (step 410). The DBMS determines if the PI ID is valid (step 412), such as by determining whether a security suspense record has been inserted into the associated account ID. If the PI ID is not valid, notification of the invalid PI ID (step 414) is provided, for example, to the terminal 110, and the transaction is terminated.

If the PI ID is valid, then the DBMS determines the account ID and customer ID from its query of the database 130 (step 416), and determines if the transaction is within the credit limit established for the account, i.e., the credit limit established for all transactions from all cardholders using the account (step 418). If within the account credit limit, the transaction is posted to the account (step 420). If not within the account credit limit, the terminal 110 is notified that the transaction is not valid (step 422), and the transaction is terminated.

Once the transaction is posted to the account, the DBMS determines whether the specific customer/cardholder using the account is to have his/her transactions separately tracked (step 424), and if this is to be done, then a determination is made (if the card issuer has optionally prepared the DBMS) whether the transaction is within limits or criteria established for that customer (step 426). If not within those limits, the terminal 110 is notified that the transaction is invalid (step 428) and the transaction is terminated. If the transaction is within the limits, it is posted or stored in the database (and related to the customer ID) so that it can be collected or tracked for that particular customer (step 430). Once this is done, the transaction is complete. Also, if the transaction is not to be tracked for the customer, at step 424, the transaction is complete (without going through steps 426, 428 or 430).

It can be seen from the preceding discussion that the present invention provides a novel method and system for providing and maintaining account, customer, role and presentation instrument identifiers in an account management network or system. While detailed descriptions of presently preferred embodiments of the invention have been given above, various alternatives, modifications, and equivalents will be apparent to those skilled in the art without varying from the spirit of the invention. As one example of equivalents, the presentation instrument may be an instrument other than a credit card, and in fact could be any card or instrument (e.g., debit card, ATM card, customer ID card) that is used to conduct a financial or other transaction, either in person or on-line. Furthermore, the presentation instrument need not be a tangible instrument at all, but could be simply an identifier or password (e.g., string of characters) that a customer has memorized and that can be provided whenever a transaction is to be conducted.

Therefore, the above description should not be taken as limiting the scope of the invention, which is defined by the appended claims.

What is claimed is:

1. A computer-based system for managing accounts, wherein more than one customer may be associated with each account, wherein each customer has a role relating to such account, and wherein a customer may conduct a transaction for such account by using a presentation instrument issued to that customer, the presentation instrument presented by the customer to a merchant in order to conduct a transaction, the system comprising:

a database for storing a customer ID associated with each customer, an account ID associated with each account, and a presentation ID associated with each presentation instrument, the database structured for relating each presentation ID to a specific customer and to one account used by that specific customer; and a database management system for managing the data stored in the database and for posting transaction data to any account in response to receiving a presentation ID with such transaction data, the presentation ID being used by the data management system to access the account and thereby reflect that the transaction has been conducted for the account.

2. The system of claim 1, wherein the customer ID is permanent and does not appear on the presentation instrument as the presentation ID, so that if the presentation instrument is no longer usable, a new presentation ID may be issued and the new presentation ID related to the permanent customer ID in the database.

3. The system of claim 2, wherein the database management system assigns a security suspense record to the account ID for the account associated with the presentation instrument that is no longer usable.

4. The system of claim 3, wherein the database management system invalidates any transaction where a presentation ID is received that relates to an account ID having a security suspense record.

5. The system of claim 1, wherein the customer ID is permanent and if a new accounts is established for a customer, the account ID for the new account may be related to the permanent customer ID of that customer.

6. The system of claim 1, wherein the customer ID, and each account ID and presentation ID are different.

7. The system of claim 1, wherein the customer ID is different than either the account ID and presentation ID.

8. The system of claim 1, wherein the presentation ID may be the same as the account ID, but is different than the customer ID.

9. The system of claim 1, wherein a customer may have one of at least two roles for any account, wherein one of those roles is a primary cardholder role, having primary financial responsibility for that account.

10. The system of claim 9, wherein the other of the roles is a secondary cardholder role, having the ability to conduct transactions under the account but not having primary financial responsibility for that account.

11. The system of claim 9, wherein the other of the roles provides the ability to conduct transactions under the account, with those transactions limited by a credit limit.

12. The system of claim 9, wherein the other of the roles has the ability to conduct transactions under the account, with such transactions tracked to enable the card issuer to market services to the customer having the other of the roles.

13. The system of claim 1, wherein the presentation instrument is a credit card, and wherein the presentation ID is a card number appearing on the credit card.

14. The system of claim 1, wherein the database is a relational database.

15. A computer-based method for managing accounts, wherein an account is accessible by multiple customers in order to conduct transactions, and wherein a customer may conduct a transaction against the account by using a presentation instrument issued to that customer by an issuing institution, and presenting the presentation instrument to a merchant in order to post a transaction to the account, the method comprising:

provide a database;

storing in the database a customer ID associated with each customer, an account ID associated with each account, and a presentation ID used by each customer for accessing at least one of the accounts, the presentation ID being different than the customer ID;

structuring the database in order to relate, to each customer ID, the account ID for at least one account accessible by that customer, and the presentation ID issued to that customer for accessing such account; and managing the database in order to post a transaction by a specific customer to a specific account in response to receiving transaction data with the presentation ID issued to the specific customer, the presentation ID being used by the data management system to retrieve the account ID of the specific account and thereby associate the transaction data with the specific customer and with the specific account.

16. The method of claim 15, further comprising:

storing a suspense record in connection with the account ID, when the presentation ID associated with that account ID is not longer usable.

17. The method claim 15, wherein an account may be accessed by more than one customer and wherein the method further comprises:

providing a plurality of customer roles in connection with such account, wherein at least one of the roles is one having primary financial responsibility for the account.

18. The method of claim 17, wherein another one of the roles is one not having primary financial responsibility for the account.

19. The method claim 17, wherein credit limits for transactions conducted by customers for the account may be different for each of the customer roles.

20. The method claim 15, further comprising:

establishing transaction criteria for at least one of the roles, so that when the criteria is met, financial service information may be provided by the issuing institution to the customer having that role.

21. The method of claim 15, further comprising:

storing multiple account IDs in connection with the one customer ID associated with a customer having access to each account associated with the multiple account IDs; and storing multiple presentation IDs, one associated with each of the multiple account IDs.

22. The method of claim 21, wherein each presentation ID is different than its associated account ID.

23. A computer-based system for managing accounts, wherein more than one customer may conduct a transaction in connection with an account, wherein each customer has a role relating to the account, and wherein a customer may conduct a transaction for the account by using a presentation instrument issued to that customer, the presentation instrument presented to a merchant in order to conduct a transaction against the account, the system comprising:

means for storing a customer ID associated with each customer, an account ID associated with each account, a presentation ID associated with each presentation instrument, and a role identifier associated with each customer and identifying a role that such customer has in connection with an account, the database structured for relating each presentation ID to both a specific customer and to an account used by that specific customer; and means for managing the data stored in the database and for posting transaction data to any account in response to receiving a presentation ID with such transaction data, the presentation ID being used by the data management system to access the account and thereby reflect that the transaction has been conducted in connection with the account.

* * * * *

UNITED STATES PATENT AND TRADEMARK OFFICE
CERTIFICATE OF CORRECTION

PATENT NO. : 6,993,510 B2
DATED : January 31, 2006
INVENTOR(S) : Robert C. Guy et al.

It is certified that error appears in the above-identified patent and that said Letters Patent is hereby corrected as shown below:

<u>Title page,</u>
Item [75], Inventors, should read as follows:
-- Robert C. Guy
  Diane Lyn Snider
  Douglas A. Goering
  Darren D. Beck
  Tony D. James
  George D. Bright
  William F. Harrington
  David G. Rivera
  Michael B. Grear
  Gretchen L. Donlin --.

Signed and Sealed this

Thirteenth Day of June, 2006

JON W. DUDAS
*Director of the United States Patent and Trademark Office*